(12) United States Patent
Bui et al.

(10) Patent No.: US 8,780,486 B2
(45) Date of Patent: Jul. 15, 2014

(54) DETERMINING A SKEW ERROR SIGNAL (SES) OFFSET USED TO DETERMINE AN SES TO ADJUST HEADS IN A DRIVE UNIT

(75) Inventors: Nhan X. Bui, Tucson, AZ (US); Angeliki Pantazi, Thalwil (CH); Tomoko Taketomi, Tokyo (JP); Kazuhiro Tsuruta, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 18 days.

(21) Appl. No.: 13/545,570

(22) Filed: Jul. 10, 2012

(65) Prior Publication Data

US 2014/0016226 A1  Jan. 16, 2014

(51) Int. Cl.
  *G11B 5/00* (2006.01)
  *G11B 5/584* (2006.01)
(52) U.S. Cl.
  USPC ........................................................... 360/76
(58) Field of Classification Search
  USPC .......... 369/44.32, 53.14, 53.15, 44.27, 44.28; 360/75, 76, 77.12, 77.17, 78.02, 78.14, 360/48
  See application file for complete search history.

(56) References Cited

U.S. PATENT DOCUMENTS

| | | | |
|---|---|---|---|
| 7,054,093 B1 | 5/2006 | Anderson et al. | |
| 7,106,544 B2 * | 9/2006 | Dugas et al. | 360/75 |
| 7,436,621 B2 | 10/2008 | Goker et al. | |
| 7,764,460 B2 | 7/2010 | Bates et al. | |
| 7,876,521 B2 | 1/2011 | Cherubini et al. | |
| 7,961,421 B1 | 6/2011 | Bui et al. | |
| 8,094,406 B2 | 1/2012 | Bates et al. | |
| 8,154,811 B2 | 4/2012 | Barsotti et al. | |
| 2010/0067139 A1 | 3/2010 | Bates et al. | |
| 2011/0182157 A1 | 7/2011 | Hoerger | |

FOREIGN PATENT DOCUMENTS

WO  2011077340  6/2011

OTHER PUBLICATIONS

PCT International Search Report dated Oct. 8, 2013 for Application No. PCT/CA2013/050479 filed Jun. 21, 2013.
PCT Written Opinion dated Oct. 8, 2013 for Application No. PCT/CA2013/050479 filed Jun. 21, 2013.

* cited by examiner

*Primary Examiner* — Nabil Hindi
(74) *Attorney, Agent, or Firm* — Konrad Raynes Davda & Victor LLP; David W. Victor

(57) ABSTRACT

Provided are a computer program product, system, and method for determining a skew error signal (SES) offset used to determine an SES to adjust heads in a drive unit. A determination is made of a first difference in a first orientation with respect to a direction of movement of the recordable storage media based on first and second position information read by first and second servo read elements on a first head. A determination is made of a second difference in a second orientation with respect to the direction of movement of the recordable storage media based on third and fourth position information read by the first servo read element and a third servo read element on a second head. An offset, calculated based on the determined first and second difference, is used to generate an error signal to adjust the first and second heads.

30 Claims, 6 Drawing Sheets

No head offset
SESul = SESlr

With head offset
SESul = 0; SESlr is not 0

DETERMINING A SKEW ERROR SIGNAL (SES) OFFSET USED TO DETERMINE AN SES TO ADJUST HEADS IN A DRIVE UNIT

BACKGROUND OF THE INVENTION

1. Field of the Invention

The present invention relates to a computer program product, system, and method for determining a skew error signal (SES) offset used to determine an SES to adjust heads in a drive unit.

2. Description of the Related Art

Advanced magnetic-tape cartridges hold multiple Terabytes (TB) of data, where one Terabyte equals 1000 Gigabytes and one Gigabyte equals 1000 Megabytes. The recording densities necessary to achieve this capacity require that the read head elements have nearly or identically the width of the write head elements. Problems can arise in such high density magnetic tape cartridges if the tape medium becomes skewed due to heat or density, which can cause the read heads to read off-track during the write-verify, and this misregistration resulting in either write-verify errors or the inability to write-verify altogether. The write-verify process is actually the reading of the freshly written data during the actual write process.

Servo patterns may be used to determine an extent of misregistration, or the extent to which a read head is reading off the track. Misregistration may result when there is a skew arising from when the head does not remain perfectly perpendicular relative to the direction in which the tape moves. Misregistration can also occur when the write and read heads on a head unit have an offset. These misregistrations prevent the read element on a read head from reading on-track data written by a corresponding write element on the write head.

In timing-based servo (TBS) systems, recorded servo patterns consist of magnetic transitions with two different azimuthal slopes. Head position is derived from the relative timing of pulses, or dibits, generated by a narrow head reading the servo patterns. TBS patterns also allow the encoding of additional longitudinal position (LPOS) information without affecting the generation of the transversal position error signal (PES). This is obtained by shifting transitions from their nominal pattern position using pulse-position modulation (PPM).

A servo controller of a tape drive calculates a skew to generate a skew error signal (SES) used to adjust the skew of the tape heads with respect to the tape media. The servo controller may measure a difference in times when the servo pattern is read by an upper and lower servo read elements on the same head. An angle of the skew may be determined by calculating an arctangent of the difference of the times of the read servo pattern by a distance between the servo bands or servo read elements on the same head. This skew angle is then used to adjust the heads to prevent misregistration.

There is a need in the art for improved techniques to determine the skew used to adjust the heads to avoid misregistration errors.

SUMMARY

Provided are a computer program product, system, and method for determining a skew error signal (SES) offset used to determine an SES to adjust heads in a drive unit. A first servo read element and second servo read element on a first head read first and second position information from a servo pattern on a recordable storage media. A determination is made of a first difference in a first orientation with respect to a direction of movement of the recordable storage media based on the read first and second position information. The first servo read element and a third servo read element on a second head read third and fourth position information from the servo pattern. A determination is made of a second difference in a second orientation with respect to the direction of movement of the recordable storage media based on the read third and fourth position information. An offset is calculated based on the determined first and second difference. The calculated offset is used to generate an error signal to adjust the first and second heads during read and write operations with respect to the recordable storage media.

DETAILED DESCRIPTION

Described embodiments provide techniques for calculating a skew error signal (SES) offset from temporal and physical space information read by servo read elements on first and second heads. An upper and lower servo read elements on a first head read first and second position information to calculate a first SES and the upper servo read element on the first head and an upper servo read element on the second head read third and fourth position information to calculate a second SES. The first and second SESs may then be used to calculate an SES offset that is stored and later used to calculate an SES during write operations. The calculated SES is used to adjust the skew of the heads before a write operation by a first head to improve the tracking by the second head to read the written data.

Figure 1:
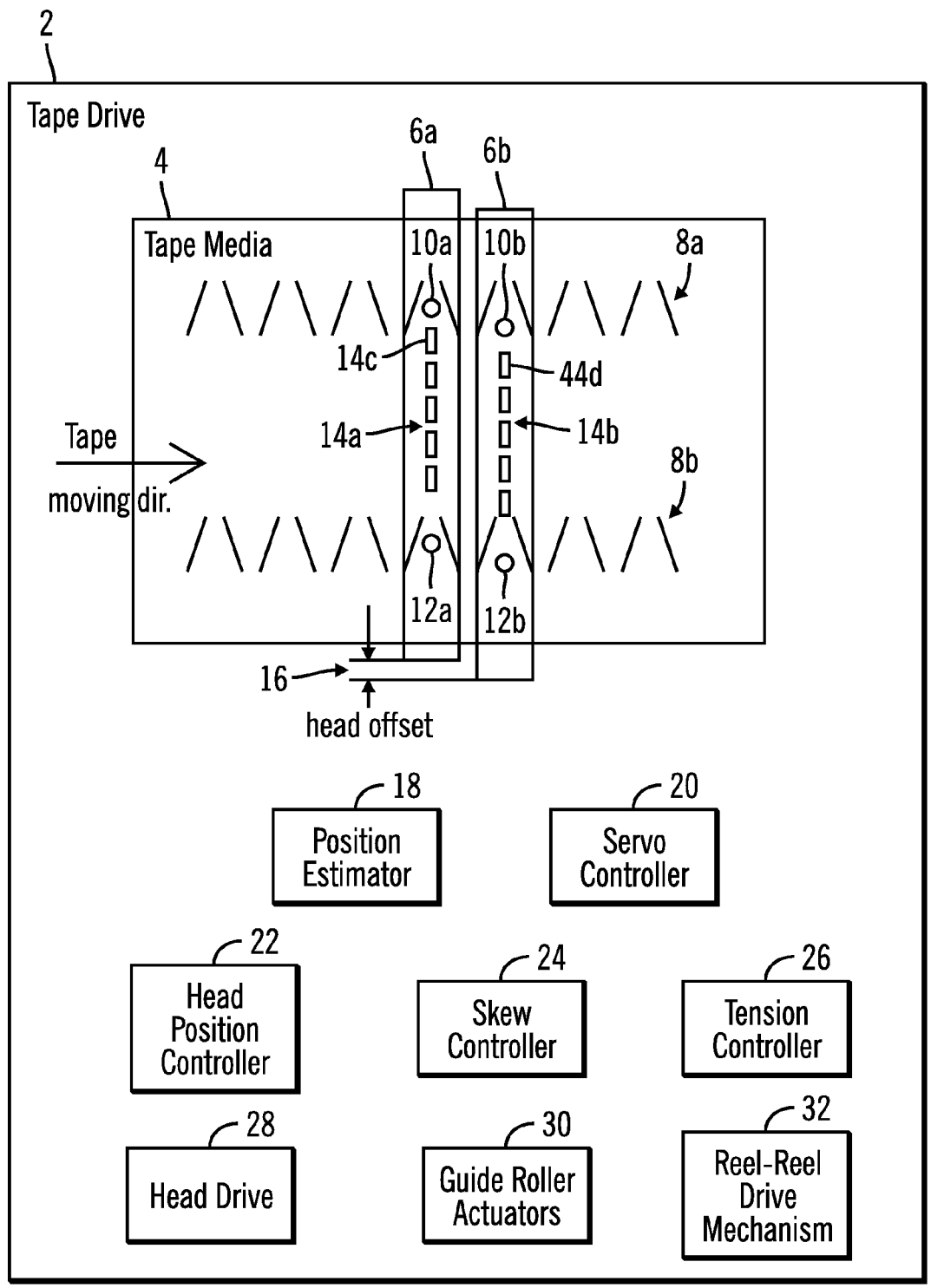
FIG. 1 illustrates an embodiment of a tape drive unit.

FIG. 1 illustrates an embodiment of a tape drive 2 unit to read a magnetic tape media 4 in a tape cartridge (not shown) inserted in the tape drive 2. The tape drive 2 includes a modular unit of heads 6a, 6b to write and read data written to the tape media 4. The tape media 4 includes servo bands 8a and 8b of servo patterns read by the heads 6 and 8 to determine the position of the heads 6a, 6b with respect to the tape media 4 to allow adjustment of the head position to write to the correct locations. Head 6a includes servo read elements 10a and 12a and a number of write and/or read elements 14a to read/write data on the tape media 4. Head 6b includes servo read elements 10b and 12b and a number of write and/or read elements 14b to read/write data on the tape media 4. The heads 6a and 6b may be manufactured within a Micro-electromechanical systems (MEMS) tape head. Further, the heads may be manufactured such that there is a head offset 16 between the heads 6a, 6b.

In one embodiment, read/write elements 14a include at least one write element 14c and read/write elements 14b include at least one read element 14d at a corresponding position on head 6b as the position of the at least one write element 14c on head 6a. Read element 14d on head 6b may read data written by write element 14c on head 6a, where the write 14c and read elements 14d are at corresponding positions on the heads 6a, 6b, so that a read following write operation can be performed. In further embodiments, the elements 14a and 14b may each include alternating read and write elements at corresponding positions. In one embodiment, if elements 14a include a write element at a position, the elements 14b would include a read element at the corresponding position and if elements 14b include a read element at a position, the elements 14b would include a write element at the corresponding position.

The tape drive 2 includes a position estimator 18, servo controller 20, head position controller 22, skew controller 24, tension controller 26, head drive 28, guide roller actuators 30, and a reel-reel drive mechanism 32. The position estimator 18 may process the servo read signals, read by the servo read elements servo read elements 10a, 10b, 12a, 12b, to produce position error signals (PES) provided to the head position controller 22 to move the heads 6a, 6b transversely, across the tape movement direction, to correct for position errors. As discussed, the heads 6a, 6b may be integrated in the same module so that the head drive 28 moves the integrated head module.

The servo controller 20 receives from the position estimator 18 the positions of the servo read elements 10a, 10b, 12a, 12b to calculate a skew error signal (SES), comprising an estimate of the skew angle of the tape media 4 relative to the heads 6a, 6b. The servo controller 20 supplies the SES to the skew controller 24 which supplies control signals to the guide roller actuators 30 to tilt guide rollers (not shown) in the tape media 4 path to counter tape skew. The servo controller 20 may further supply control signals to a tension controller 26. The tension controller 26 controls reel-to-reel drive mechanism 32 to adjust a motor moving the tape media 4 to counter tension variation.

Figure 2:
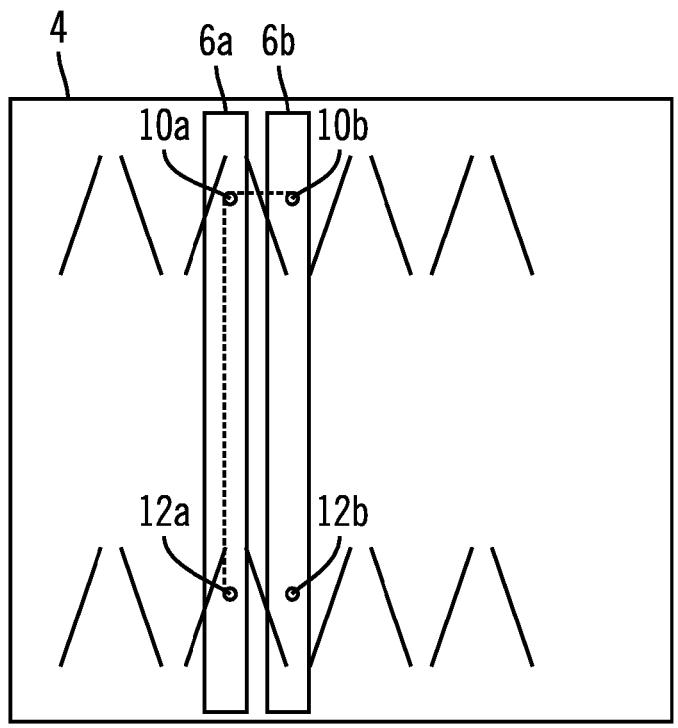
FIGS. 2, 3, and 4 illustrate different arrangements of the heads with respect to the tape media.
Figure 3:
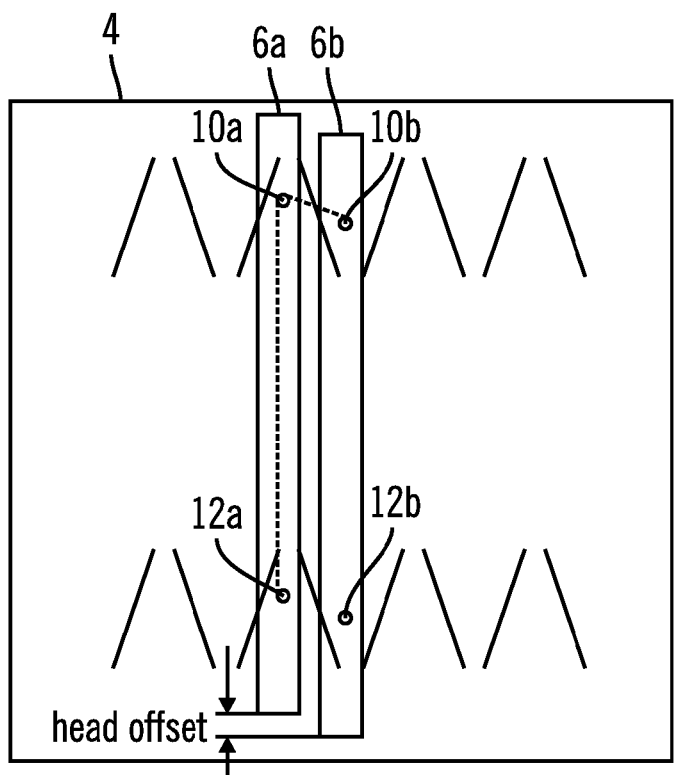
Figure 4:
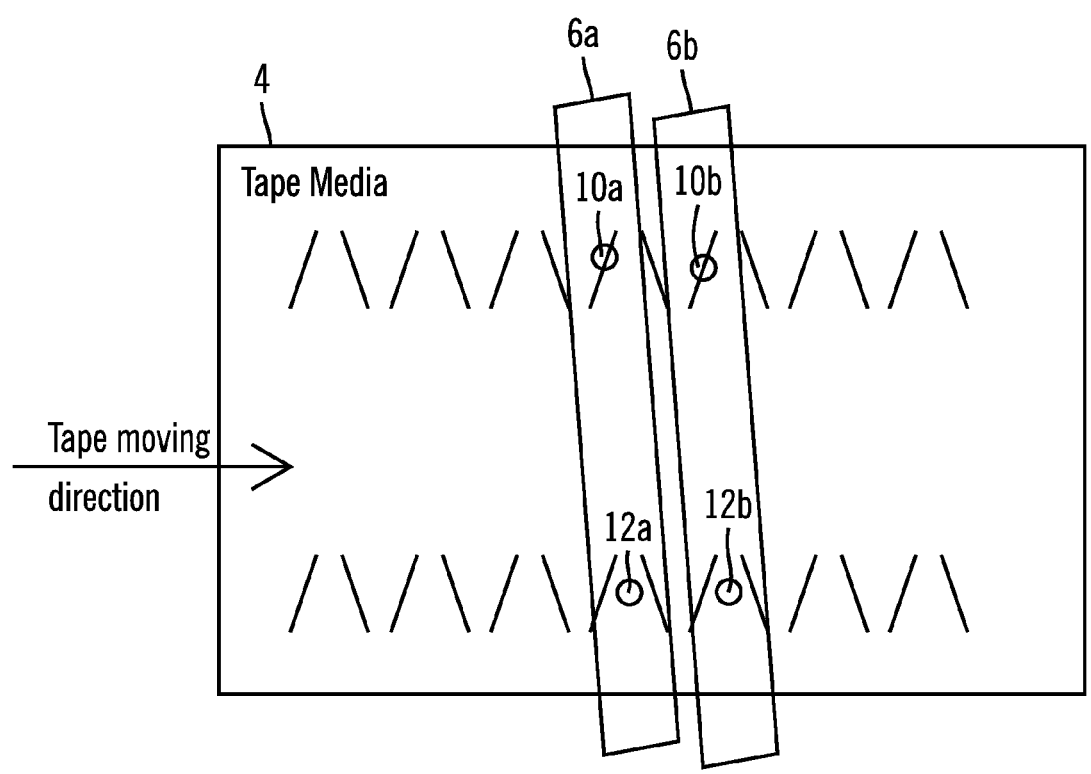

FIG. 2 illustrates a situation where there is no offset of the heads 6a, 6b with respect to each other or a skew of zero. FIG. 3 illustrates a situation where there is an offset 16, such that the servo read elements 10a, 10b, 12a, 12b are skewed or offset with respect to each other. FIG. 4 illustrates how with the described embodiments the heads 6a, 6b are adjusted by a skew angle to align the heads 6a, 6b on an axis in the direction in which the tape media 4 is moving.

Figure 5:
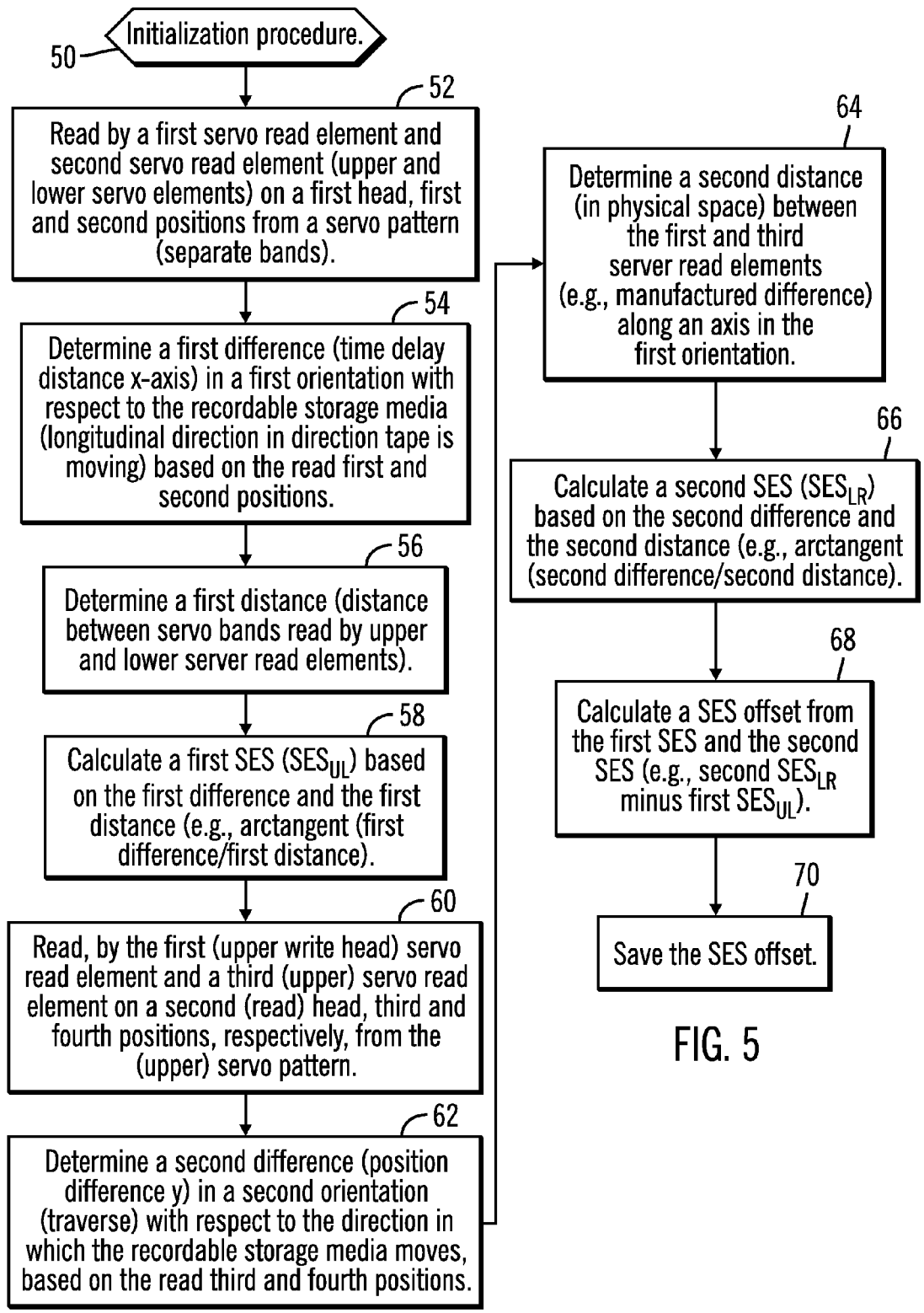
FIG. 5 illustrates an embodiment of operations to calculate a skew error signal (SES) offset.

FIG. 5 illustrates an embodiment of operations performed by components of the tape drive, such as the position estimator 18 and servo controller 20, to calculate a SES offset that is later used during write operations to control the skew controller 24 to adjust the skew of the heads 6a, 6b to correct for skew errors. Control begins with an initialization procedure 50, which may occur when a tape cartridge (not shown) having the tape media 4 is inserted in the tape drive 2. Upon initialization (at block 50), the first servo read element 10a and the second servo read element 12a on the first head 6a read (at block 52) first and second positions, respectively, from the servo bands 8a, 8b of the servo pattern. In one embodiment, these signals are received by the position estimator 18 which adjusts for position errors and sends to the servo controller 20 to use to calculate the SES offset. The first 10a and second 12a servo elements may be characterized as an upper and lower servo read elements on the same head 6a, such as a write head, which are used to calculate first SES which may be characterized as an upper-lower SES or $SES_{UL}$.

Figure 7:
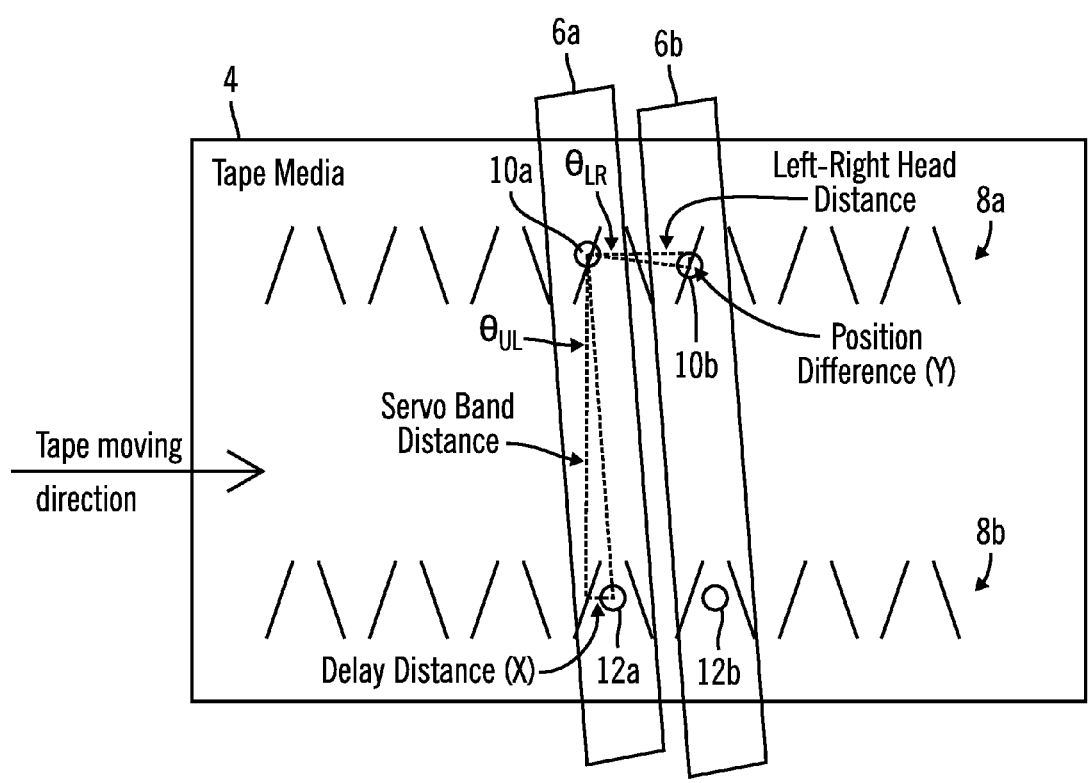
FIG. 7 illustrates an arrangement of the heads with respect to the tape media and the information used to calculate the SES related values and SES offset.

The servo controller 20 determines (at block 54) a first difference in a first orientation (horizontal with respect to the direction in which the tape media 4 is moving) based on the read first and second positions, where the difference may comprise a delay difference between the times the first 10a and second 12a servo read elements read the servo bands 8a, 8b, respectively. FIG. 7 labels this first difference as the "Delay Distance (X)", which may be a distance between times the servo read elements 10a, 12a read the servo bands 8a, 8b in a direction in which the tape 4 is moving. The servo controller 20 determines (at block 56) a first distance, which may comprise a vertical distance (in the second orientation) between servo bands 8a, 8b read by upper 10a and lower 12a servo read elements. FIG. 7 labels this distances as the "Servo Band Distance". This first distance may be provided by the position estimator 18 or a known difference based on the configuration of the servo bands 8a, 8b. The servo controller 20 calculates (at block 58) a first SES ($SES_{UL}$) based on the first difference (delay times in the horizontal x-axis direction) and the first distance. The $SES_{UL}$ may be calculated as the arctangent of the first difference/first distance to provide a skew angle for the upper-lower measurements, shown as $\theta_{UL}$ in FIG. 7.

The first 10a (upper write head) servo read element and a third 10b (upper) servo read element on the second head 6b read (at block 60) a third and fourth positions, respectively, from the (upper) servo pattern 8a. In one embodiment, these signals are received by the position estimator 18 which adjusts for position errors and sends to the servo controller 20 to use to calculate the SES offset. The first 10a and third 10b servo elements may be characterized as left and right servo read elements on different heads 6a, 6b, and are used to calculate a second SES which may be characterized as a left-right SES or $SES_{LR}$.

The servo controller 20 determines (at block 62) a second difference (position difference y comprising a distance in physical space) in a second orientation, transverse or vertical with respect to the direction in which the recordable storage media (tape) moves, based on the read third and fourth positions. FIG. 7 shows this difference labeled as the "Position Difference (Y)" that is in a vertical orientation on the y-axis with respect to the direction in which the tape media 4 moves. The servo controller 20 determines (at block 64) a second distance between the first 10a and third 10b servo read elements (e.g., manufactured difference) along an axis in the first orientation in the direction in which the tape media 4 moves. This difference between the servo read elements 10a and 10b may be indicated in manufacturing parameters maintained by the servo controller 20, and is labeled "Left-Right Head Distance" in FIG. 7. The servo controller 20 calculates (at block 66) a second SES ($SES_{LR}$) based on the second difference and the second distance. The $SES_{LR}$ may be calculated as the arctangent of the second difference/second distance to provide a skew angle for the left (10a)-right (10b) servo read elements, shown as $\theta_{LR}$ in FIG. 7. The servo controller 20 may then calculate (at block 68) an SES offset from the first SES ($SES_{UL}$) and the second SES ($SES_{LR}$). In one embodiment, the SES offset is calculated as $SES_{UL}$ minus $SES_{LR}$. The calculated SES offset is saved (at block 70) for later use to calculate the SES to use to skew the heads 6a, 6b for write operations.

Figure 6:
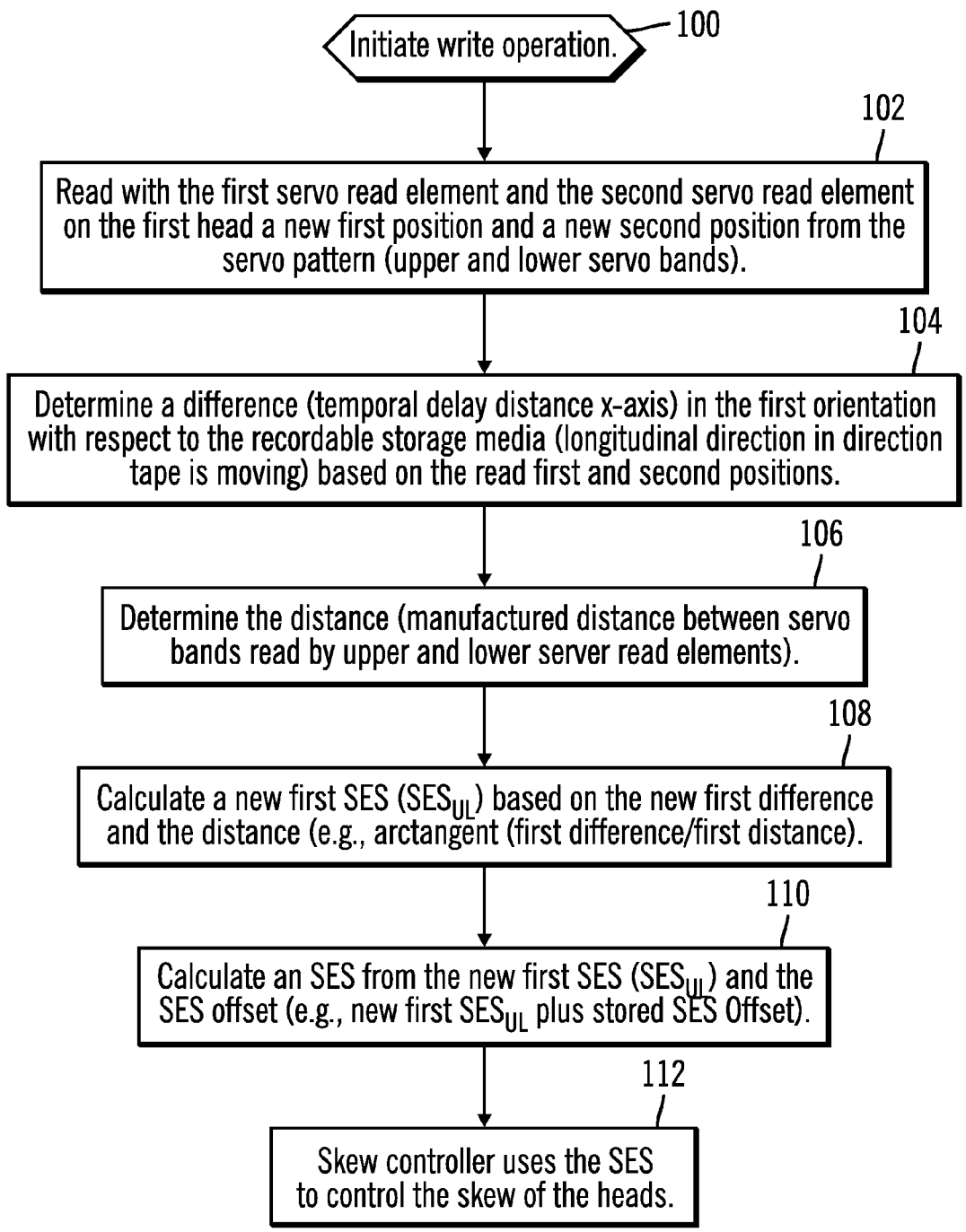
FIG. 6 illustrates an embodiment of operations to use the SES offset to calculate an SES during write operations to adjust the skew of the heads before the write operation is performed.

FIG. 6 illustrates an embodiment of operations performed by the position estimator 18 and servo controller 20 to use the saved SES offset to determine a SES to use to adjust the skew of the heads 6a, 6b for a write operation, such as a write operation by a write element 14a on head 6a that is read by a corresponding read element 14b on head 6b to follow the write. The first servo read element 10a and the second servo read element 12a on the first head 6a reads (at block 102) a new first position and a new second position from the servo pattern (upper 8a and lower 8b servo bands). The servo controller 20 determines (at block 104) a temporal difference (time delay distance x-axis) in the first orientation with respect to the recordable storage media (horizontal direction along the x-axis in the direction the tape is moving) based on the read first and second positions. The servo controller 20 further determines the distance (manufactured distance) between servo bands 8a, 81b read by upper 10a and lower 12a servo read elements. The new first $SES_{UL}$ is calculated (at block 108) based on the new first difference and the first distance. In one embodiment, $SES_{UL}$ may be determined as the arctangent of the new first difference divided by the new first distance.

The servo controller 20 then calculates (at block 110) the SES from the new first SES ($SES_{UL}$) and the SES offset (e.g., new first $SES_{UL}$ plus stored SES Offset). The servo controller 20 then provides the calculated SES to the skew controller 24 to use to control the skew of the heads 6a, 6b. In this way, during write operations, skew values in both the vertical and horizontal orientations may be used to calculate the SES used to adjust the skew of the heads by calculating only one SES based on the servo read elements on one head.

Described embodiments provide techniques to calculate a SES offset to correct for skew of the heads with respect to the tape media by calculating two different SESs. A first SES may be based on a difference of the signal read by two servo read elements on a same head reading the servo pattern, where the difference may comprise a temporal difference in the times the servo patterns were read, and a distance between the servo read elements. A second SES may be based on a difference of positions in physical space read by servo read elements on different heads and a distance between the servo read elements. The first and second SESs may comprise angles based on the measured differences in time and physical space and determined distances. The SES offset may be calculated as a function of the first and second SESs, such as by adding the first and second SESs. During write operations, the SES offset may be used to calculate the SES signal that is used to correct the skew of the heads with respect to the tape media.

The described components of the tape drive 2, including 18, 20, 22, 24, 26 may comprise discrete logic, ASIC (application specific integrated circuit), FPGA (field programmable gate array), custom processors, etc.

The described components of the tape drive 2, e.g., 18, 20, 22, 24, 26, shown in FIG. 1 may alternatively be implemented in subroutines in programs or other software implementations executed by a processor. Such programs implementing the operations of the servo channel components described with respect to FIG. 1 may be implemented in a computer readable medium, such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.).

The described embodiments were described with respect to a tape drive 2 having heads 6a, 6b, implemented on an integrated head unit. In an alternative embodiment, the heads 6a, 6b may be on separately movable and controllable units. In alternative embodiments, the described embodiments may be used to adjust read and write heads for storage media other than tape, such as magnetic disk, optical storage, etc.

The described embodiments discussed adjusting the heads for a read while write (RWW) operation. The described operations to adjust the skew of the heads may also be used for operations other than RWW.

The components shown in FIG. 1 shown as separate components may be implemented in a single circuit device or functions of one illustrated component may be implemented in separate circuit devices. Moreover, operations described with respect to certain components, such as generating the interpolation time instants and correlating the data, may be performed by other components in the servo channel.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, an Application Specific Integrated Circuit (ASIC), FPGA (field programmable gate array), custom processors, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for controlling heads in a drive to access data on a recordable storage media, the computer program product comprising a computer readable storage medium having computer readable program code embodied therein that executes to perform operations, the operations comprising:

reading, by a first servo read element and second servo read element on a first head, first and second position information from a servo pattern on a recordable storage media;

determining a first difference in a first orientation with respect to a direction of movement of the recordable storage media based on the read first and second position information;

reading, by the first servo read element and a third servo read element on a second head, third and fourth position information from the servo pattern;

determining a second difference in a second orientation with respect to the direction of movement of the recordable storage media based on the read third and fourth position information;

calculating an offset based on the determined first and second differences; and using the calculated offset to generate an error signal to adjust the first and second heads during read and write operations with respect to the recordable storage media.

2. The computer program product of claim 1, wherein the first head includes a write element and the second head includes a read element positioned to read data written by the write element on the first head, wherein the read element on the second head performs a read following a write written by the write element on the first head.

3. The computer program product of claim 1, wherein the first orientation is horizontal with respect to the direction of movement of the recordable storage media and wherein the second orientation is vertical with respect tot he direction of movement.

4. The computer program product of claim 3, wherein the offset comprises a skew error signal (SES) offset, and wherein calculating the SES offset comprises:
 calculating a first SES from the first difference;
 calculating a second SES from the second difference;
 calculating the SES offset from the first SES and the second SES.

5. The computer program product of claim 4, wherein calculating the first SES considers a first distance between the first and second servo read elements, and wherein calculating the second SES considers a second distance between the first and third servo read elements in the first orientation.

6. The computer program product of claim 5, wherein calculating the first SES comprises calculating an arctangent of the first difference divided by the first distance, and wherein calculating the second SES comprises calculating an arctangent of the second difference divided by the second distance, and wherein the SES offset comprises the second SES minus the first SES.

7. The computer program product of claim 5, wherein the servo pattern has a first and second servo bands, wherein the first servo band is read by the first servo read element and the third servo read element and wherein the second servo band is read by the second servo read element, wherein the first and second position information comprises temporal information indicating when the first and second servo read elements read the first and second servo bands, respectively, and wherein the first distance comprises a distance in physical space between the first and second servo bands and wherein the second distance comprises a distance in physical space between the first and third servo read elements along.

8. The computer program product of claim 1, wherein the recordable storage media comprises a magnetic tape storage media, and wherein the drive comprises a tape drive.

9. The computer program product of claim 4, wherein the generated error signal comprises a SES used to skew the first and second heads, wherein using the calculated SES offset comprises:
 reading, with the first servo read element and the second servo read element on the first head, new first position information and new second position information from the servo pattern;
 determining a new first difference in the first orientation based on the read new first and second positions;
 calculating a new first SES from the new first difference;
 calculating the SES from the new first SES and the SES offset; and
 using the calculated SES to adjust the skew of the first and second heads.

10. The computer program product of claim 9, wherein calculating the SES comprises adding the new first SES to the SES offset.

11. A system to access data on a recordable storage media having a servo pattern, comprising:
 a first head having a first servo read element and second servo read element;
 a second head having a third servo read element;
 a computer readable storage media having logic executed to perform operations, the operations comprising:
  receiving first and second position information read by the first servo read element and the second servo read element from the servo pattern on the recordable storage media;
  determining a first difference in a first orientation with respect to a direction of movement of the recordable storage media based on the read first and second position information;
  receiving third and fourth position information read by the first servo read element and the third servo read element from the servo pattern;
  determining a second difference in a second orientation with respect to the direction of movement of the recordable storage media based on the read third and fourth position information;
  calculating an offset based on the determined first and second differences; and
  using the calculated offset to generate an error signal to adjust the first and second heads during read and write operations with respect to the recordable storage media.

12. The system of claim 11, wherein the first head includes a write element and the second head includes a read element positioned to read data written by the write element on the first head, wherein the read element on the second head performs a read following a write written by the write element on the first head.

13. The system of claim 11, wherein the first orientation is horizontal with respect to the direction of movement of the recordable storage media and wherein the second orientation is vertical with respect tot he direction of movement.

14. The system of claim 13, wherein the offset comprises a skew error signal (SES) offset, and wherein calculating the SES offset comprises:
 calculating a first SES from the first difference;
 calculating a second SES from the second difference;
 calculating the SES offset from the first SES and the second SES.

15. The system of claim 14, wherein calculating the first SES considers a first distance between the first and second servo read elements, and wherein calculating the second SES considers a second distance between the first and third servo read elements in the first orientation.

16. The system of claim 15, wherein calculating the first SES comprises calculating an arctangent of the first difference divided by the first distance, and wherein calculating the second SES comprises calculating an arctangent of the second difference divided by the second distance, and wherein the SES offset comprises the second SES minus the first SES.

17. The system of claim 15, wherein the servo pattern has a first and second servo bands, wherein the first servo band is read by the first servo read element and the third servo read element and wherein the second servo band is read by the second servo read element, wherein the first and second position information comprises temporal information indicating when the first and second servo read elements read the first and second servo bands, respectively, and wherein the first distance comprises a distance in physical space between the first and second servo bands and wherein the second distance comprises a distance in physical space between the first and third servo read elements along.

18. The system of claim 11, wherein the recordable storage media comprises a magnetic tape storage media, and wherein the system comprises a tape drive.

19. The system of claim 14, wherein the generated error signal comprises a SES used to skew the first and second heads, wherein using the calculated SES offset comprises:
receiving new first position information and new second position information read by the first servo read element and the second servo read element from the servo pattern;
determining a new first difference in the first orientation based on the read new first and second positions;
calculating a new first SES from the new first difference;
calculating the SES from the new first SES and the SES offset; and
using the calculated SES to adjust the skew of the first and second heads.

20. The system of claim 19, wherein calculating the SES comprises adding the new first SES to the SES offset.

21. A method for controlling heads in a drive to access data on a recordable storage media, comprising:
reading, by a first servo read element and second servo read element on a first head, first and second position information from a servo pattern on a recordable storage media;
determining a first difference in a first orientation with respect to a direction of movement of the recordable storage media based on the read first and second position information;
reading, by the first servo read element and a third servo read element on a second head, third and fourth position information from the servo pattern;
determining a second difference in a second orientation with respect to the direction of movement of the recordable storage media based on the read third and fourth position information;
calculating an offset based on the determined first and second differences; and
using the calculated offset to generate an error signal to adjust the first and second heads during read and write operations with respect to the recordable storage media.

22. The method of claim 21, wherein the first head includes a write element and the second head includes a read element positioned to read data written by the write element on the first head, wherein the read element on the second head performs a read following a write written by the write element on the first head.

23. The method of claim 21, wherein the first orientation is horizontal with respect to the direction of movement of the recordable storage media and wherein the second orientation is vertical with respect tot he direction of movement.

24. The method of claim 23, wherein the offset comprises a skew error signal (SES) offset, and wherein calculating the SES offset comprises:
calculating a first SES from the first difference;
calculating a second SES from the second difference;
calculating the SES offset from the first SES and the second SES.

25. The method of claim 24, wherein calculating the first SES considers a first distance between the first and second servo read elements, and wherein calculating the second SES considers a second distance between the first and third servo read elements in the first orientation.

26. The method of claim 25, wherein calculating the first SES comprises calculating an arctangent of the first difference divided by the first distance, and wherein calculating the second SES comprises calculating an arctangent of the second difference divided by the second distance, and wherein the SES offset comprises the second SES minus the first SES.

27. The method of claim 25, wherein the servo pattern has a first and second servo bands, wherein the first servo band is read by the first servo read element and the third servo read element and wherein the second servo band is read by the second servo read element, wherein the first and second position information comprises temporal information indicating when the first and second servo read elements read the first and second servo bands, respectively, and wherein the first distance comprises a distance in physical space between the first and second servo bands and wherein the second distance comprises a distance in physical space between the first and third servo read elements along.

28. The method of claim 21, wherein the recordable storage media comprises a magnetic tape storage media, and wherein the drive comprises a tape drive.

29. The method of claim 24, wherein the generated error signal comprises a SES used to skew the first and second heads, wherein using the calculated SES offset comprises:
reading, with the first servo read element and the second servo read element on the first head, new first position information and new second position information from the servo pattern;
determining a new first difference in the first orientation based on the read new first and second positions;
calculating a new first SES from the new first difference;
calculating the SES from the new first SES and the SES offset; and
using the calculated SES to adjust the skew of the first and second heads.

30. The method of claim 29, wherein calculating the SES comprises adding the new first SES to the SES offset.

* * * * *